May 15, 1951
R. POLK, SR., ET AL
2,552,733
APPARATUS FOR HOLDING CITRUS FRUIT
Filed Dec. 20, 1948
3 Sheets-Sheet 1
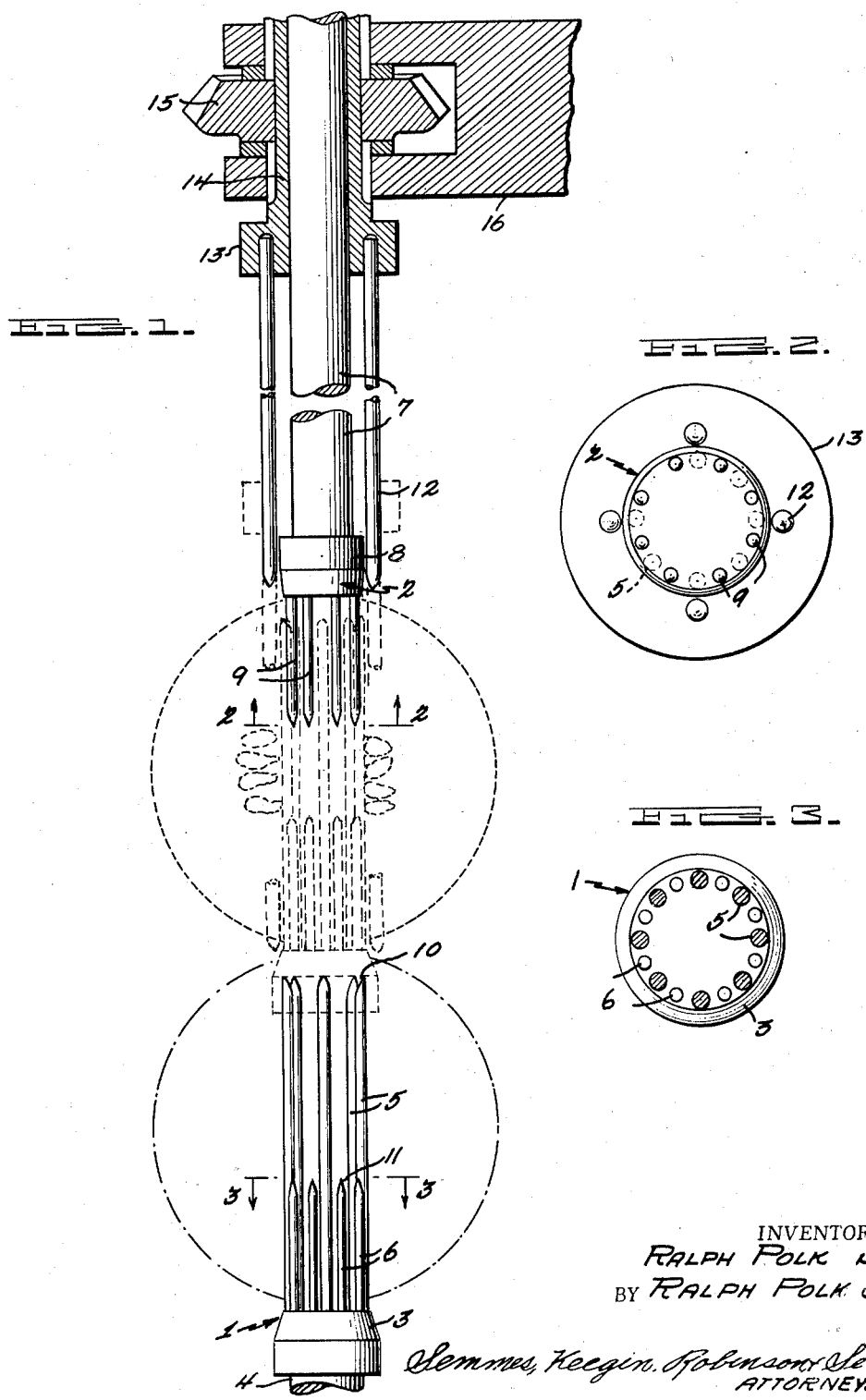
INVENTOR.
RALPH POLK SR.
BY RALPH POLK JR.
Semmes, Keegin, Robinson & Semmes
ATTORNEYS May 15, 1951 R. POLK, SR., ET AL 2,552,733
APPARATUS FOR HOLDING CITRUS FRUIT
Filed Dec. 20, 1948 3 Sheets-Sheet 2
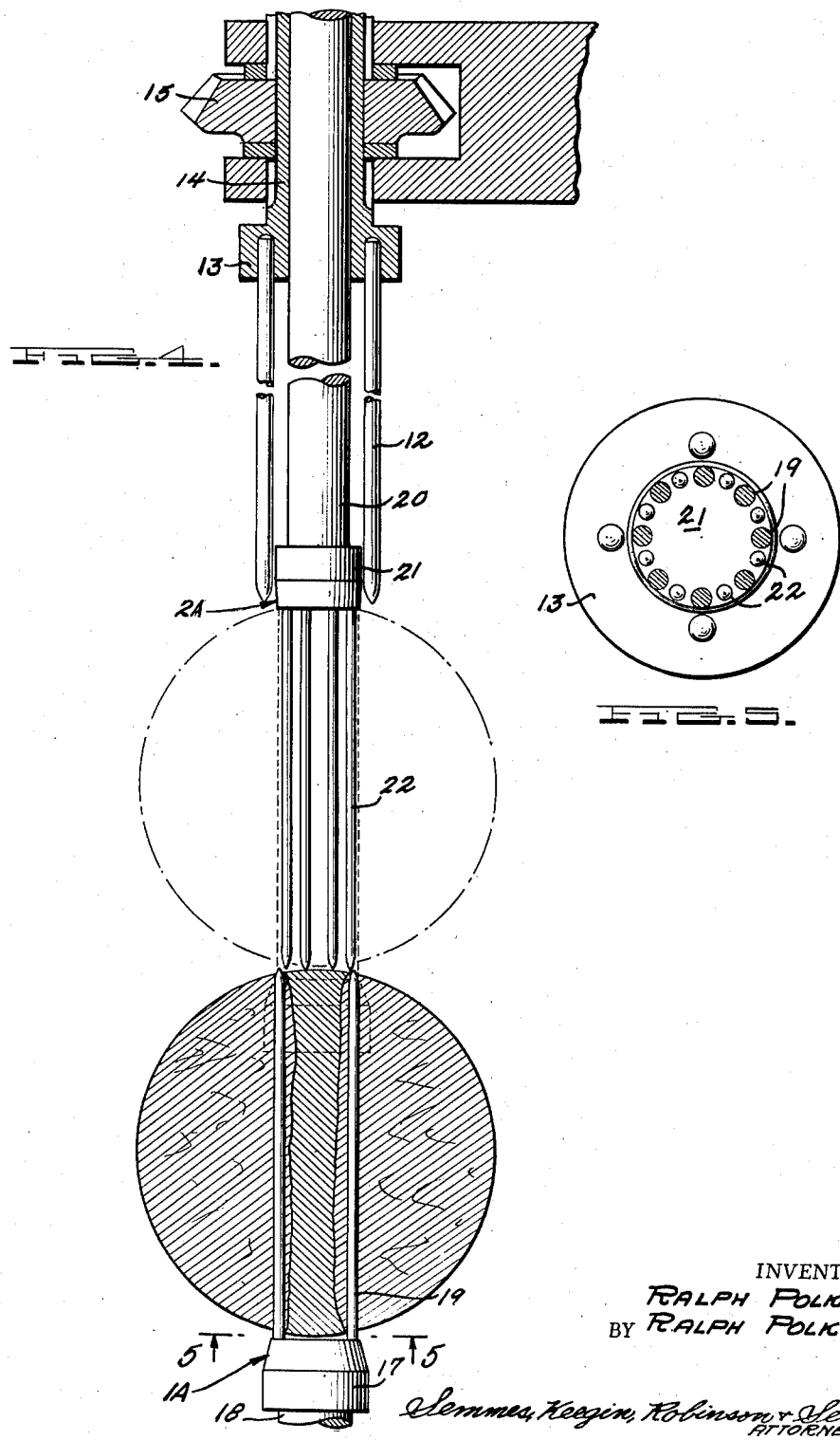
INVENTOR.
RALPH POLK SR.
BY RALPH POLK JR.
Semmes, Keegin, Robinson & Semmes
ATTORNEYS

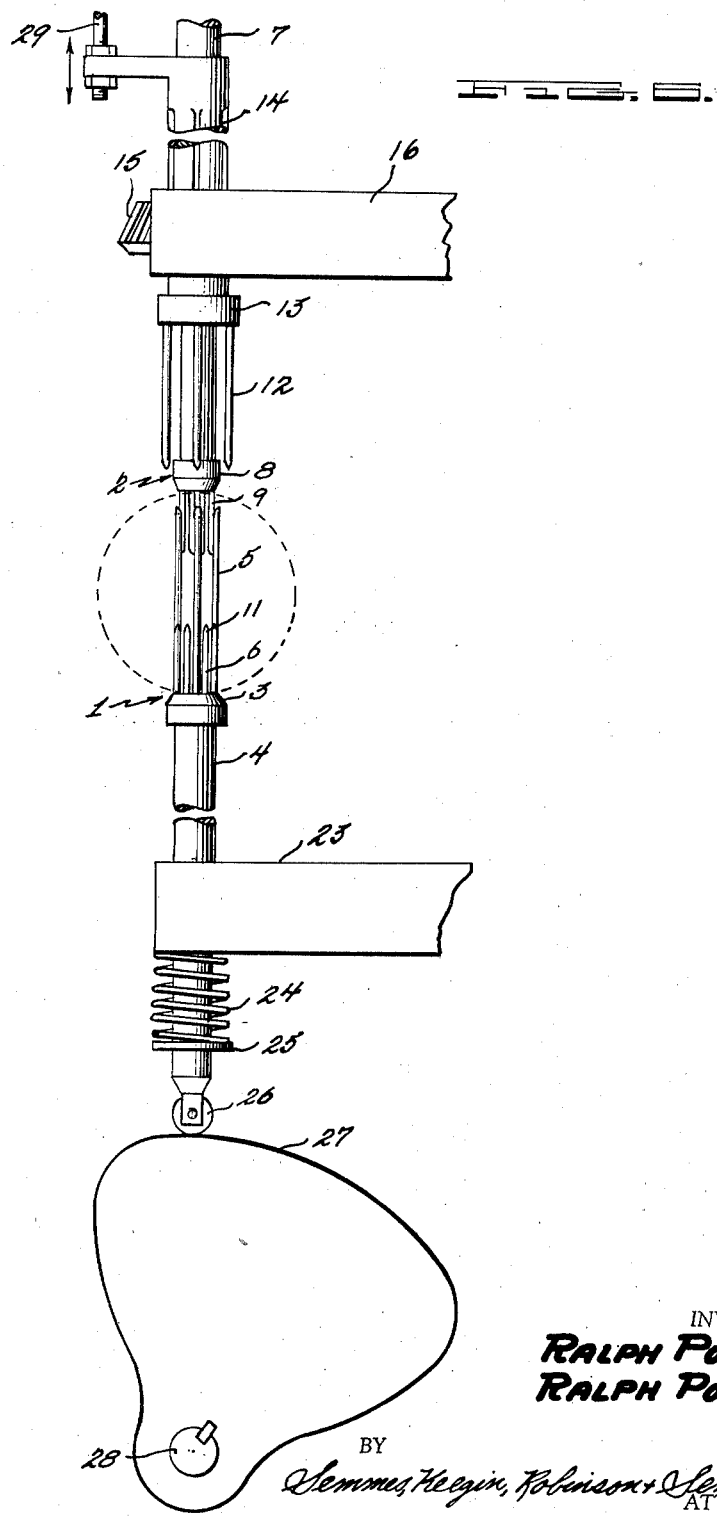

Patented May 15, 1951

2,552,733

UNITED STATES PATENT OFFICE 2,552,733

APPARATUS FOR HOLDING CITRUS FRUIT

Ralph Polk, Sr., and Ralph Polk, Jr., Tampa, Fla., assignors to Polk Development Company, Tampa, Fla., a co-partnership of Florida Application December 20, 1948, Serial No. 66,188

7 Claims. (Cl. 146—3)

This invention relates to the handling of citrus fruit and more particularly to a method and apparatus for supporting and holding the center structure of citrus fruit for the purpose of sectionizing the fruit.

"Sectionizing" in the citrus fruit industry is dividing the meat of the fruit into its membrane free, substantially whole natural sections and is carried out by first removing the peel and the portion of the membrane wall lying adjacent thereto, and then severing the bond between the meat and the radial portions of the membrane. During this latter operation the fruit is held on a spindle which usually comprises a circular series of parallel tines on which the fruit is impaled polarwise close to the core of the fruit.

We have developed machinery for mechanically sectionizing the fruit in which the peeled fruit is first impaled on a holding fork, such as disclosed in our Patent 2,199,345, the circular series of its tines being inserted into apices of the radial segment walls. Blades are then inserted polarwise through the segments just radially outside the series of holding tines. These knives are moved radially outward from the core and closely adjacent one radial membrane wall which severs the meat of the segments from this wall but leaves it still attached and supported by the other radial wall. Next, a circular series of wiper prongs carried on a rotatable spindle are inserted polarwise through the fruit concentric with and just outside the series of holding tines. This series of prongs is then rotated relatively to the tines which has the effect of wrapping the radial membranes, which are held by the tines, about the circular series of tines and stripping the segment meats from the attached radial membranes.

During the slitting and particularly during the above mentioned stripping operations, the radial membrance structure of the fruit is subjected to substantial tensioning stresses away from the core of the fruit which, unless countered or restrained by the tines of the holding fork, results in a tearing apart of the core and failure to free the section meats from the membrane.

It is evident that a holding fork with a sufficient number of tines for one to be positioned in the apex of each section of the fruit would eliminate the above difficulty. However, the insertion of a sufficient number of holding tines of sufficient size to withstand bending stresses imposed on them and in a sufficiently small circle to occupy the apex regions of the fruit sections has heretofore been difficult to accomplish. Citrus pulp offers considerable resistance to penetration to the tines of a holding fork which increases with the diameter of the tine and is multiplied by the number of tines in the holding fork. Since the number of sections of oranges and grapefruit varies from around nine to fifteen, it can be readily seen that the resistance to penetration of a fork having sufficient tines to penetrate each of the maximum number of sections, particularly if the tines were of large enough diameter to withstand substantial bending when encountering seed or during subsequent sectionizing operations, would be great enough to result in a crushing of the fruit if simultaneous insertion of all the tines were attempted.

We have heretofore attempted to provide a holding fork structure having sufficient tines for at least one to each fruit section in the form of an auxiliary fork in which the tines were arranged in a circle and inserted in the fruit in a region lying outside a smaller series of a few tines first inserted in the fruit to align and support the core and aid in the insertion of the later inserted, larger number of tines. While this arrangement was satisfactory for some fruit, the stripping or wiping prongs lying outside two concentric circles of holding tines resulted in appreciable mutilation of juice bearing pulp in young and small core fruit.

A holding fork to produce optimum results, therefore, desirably has (1) at least one tine for each of the maximum number of sections in a fruit, (2) has all of the tines arranged in a single circle to lie as closely as practicable within the apex of the radial membrane walls of the sections. In this latter regard, the sections of a fruit are seldom the same size or width, but the size differential between sections is small adjacent the core, and it will be appreciated that the closer to the core the holding fork tines are inserted, the greater the possibility for one tine to penetrate each section rather than one section to be penetrated by two tines and the adjacent section by none. It is also important in a holding fork that the tines be relatively stiff to withstand bending stresses imposed when their entering ends encounter seed and membrane tension, yet their diameter should not be increased to a size which would make insertion difficult. In this latter regard it has been found convenient and advantageous to insert the tines in two series, one subsequently to the other, the first inserted series axially aligning and holding the fruit in axial alignment with the second series. The bending moment of the tines also decreases with its length or lever arm, and we have found that satisfactory results are obtained both in penetrating the fruit and in life of the tines with axially opposed series of tines insertable from opposite poles of the fruit and which are relatively short extending into the fruit approximately only to the seed regions of the sections.

With the above factors in mind, an object of this invention is to provide a holding fork for supporting citrus fruit for the purpose of sectionizing the same which comprises a primary and a secondary series of parallel tines in coaxially aligned circles of equal diameters, adapted for opposed insertion in a fruit, the total number of tines in the two series being at least equal to the maximum number of fruit sections and the number being divided between the two series.

Another object of the invention is to provide a holding fork of the above character in which inserted tines of one series interdigitate with tines of the other series and are equally spaced circumferentially with respect thereto.

Another object of the invention is to provide a holding fork of the above character in which the tines of one series are of a smaller diameter than the tines of the other series.

A further object of the invention is to provide a holding fork of the above character in which the primary series comprises one-half the number of tines sufficient to penetrate all sections of a maximum sectioned fruit and of sufficient length to penetrate substantially into a fruit and the remaining half of the tines in the primary series being equally spaced circumferentially between first mentioned half and of a length to penetrate only to the seed region of the fruit, and the tines of the secondary series being respectively aligned axially with the shorter tines of the first series and also of a length to penetrate only to the seed region of the fruit.

To accomplish the above objects and advantages and others which will become more apparent during the course of the following description, the invention consists in the parts and combinations thereof hereinafter set forth with the understanding that various changes may be made therein by those skilled in the art such as in the size, shape, and arrangement of parts or by the substitution of equivalents without departing from the spirit of the invention or exceeding the scope of the appended claims.

In order to make the invention more clearly understood preferred embodiments thereof have been made the subject of illustration in the accompanying drawings in which:

Figure 1 is a vertical longitudinal sectional view partly in elevation partly broken away of a preferred embodiment of holding fork structure in accordance with the invention;

Figure 2 is a cross sectional view taken along the line 2—2 of Figure 1 looking in the direction of the arrows;

Figure 3 is a cross sectional view taken along the line 3—3 of Figure 1 looking in the direction of the arrows;

Figure 4 is a vertical longitudinal sectional view partly in elevation partly broken away of a modified form of holding fork structure according to the invention;

Figure 5 is a cross sectional view taken along the line 5—5 of Figure 4.

Figure 6 is an elevational view of the holding fork structure with means for producing axial movement of elements of the fork.

The fruit holding apparatus shown in Figures 1 to 3 comprises a primary holding fork 1 and a secondary or auxiliary holding fork 2. The fork 1 consists of a head 3 at the upper end of a vertical, non-rotating rod 4 which may be mounted in a sectionizing machine for movement from one station to another station thereof and also for vertical reciprocating movement at the stations in any well-known manner. For example, the non-rotating rod 4 may be slidably mounted for vertical movement in a stationary arm 23. A compressed spring 24 bears against the lower surface of the arm 23 and a collar 25 near the lower end of rod 4 to urge the rod 4 downwardly. A cam follower 26 on the lower end of rod 4 travels on a cam 27 which is keyed to a rotating shaft 28. Rotation of the shaft 28 will produce the desired reciprocating movement of primary holding fork 1.

Rigidly secured in the head 3 and extending upwardly therefrom is a circular series of equally spaced parallel tines 5 of a length sufficient to penetrate substantially into the fruit (at least beyond the center of a fruit of average size). Positioned equidistantly between the tines 5 and arranged in the same circle therewith is a series of tines 6 which are likewise rigidly secured in the head 3 and extend upwardly parallel with the tines 5. The tines 6, however, are shorter than the tines 5, having lengths to penetrate the fruit approximately only to the seed bearing region of the fruit sections.

The combined number of tines 5 and 6 is at least equal to the maximum number of sections found in citrus fruit. As stated above the number of sections in grapefruit vary between nine and fifteen. In the embodiment illustrated, which may be considered a holding fork for sectionizing grapefruit, there is provided a total of sixteen tines, one-half this number consisting of the longer tines 5 and the other half consisting of the shorter tines 6 which, as stated, alternate in the circle with the tines 5. The diameter of the series of tines is preferably such as to penetrate into the fruit sections as closely as practicable to the core of the fruit. The core diameter varies with the maturity of the fruit, but seldom exceeds about one inch in usable fruit. We have found, therefore, that sixteen tines arranged in a circle of approximately 1¼ inches in diameter, at least one tine will penetrate each of the fruit sections closely within the apex of the radial membrane walls thereof.

The auxiliary holding fork 2 is spaced above the fork 1 and comprises a stationary vertical rod 7, the lower end of which terminates in a head 8. Rigidly secured in the head 8 is a circular series of depending parallel tines 9, equal in number to the tines 6, and respectively in axial alignment with the tines 6. The tines 9 are approximately the same length as the tines 6, that is, only long enough to penetrate substantially to the seed bearing region of the fruit sections.

Preferably, the longer tines 5 should be large enough in diameter to substantially withstand bending stresses imposed on them, yet small enough not to require excessive force to insert the series into the fruit. A $\tfrac{5}{32}$ inch diameter for these tines has been found satisfactory. The shorter tines 6 and 9, however, because of their shorter lever arms and because they do not encounter seed when inserted, can be of smaller diameter, for example ⅛ inch or smaller. All of the tines are preferably pointed such as by beveling their free or entering ends as indicated at 10, or forming the ends conical as indicated at 11.

The holding fork above described is preferably combined with a relatively rotatable series of stripping prongs 12 for wrapping the membrane structure about the holding fork and stripping the section meats free from the membrane as disclosed in our Patent No. 2,240,909, granted May 6, 1941. These stripping prongs are relatively stiff pins of sufficient length to penetrate through the fruit and are set in a depending circular series, somewhat larger in diameter than the holding tines, in an enlarged end 13 of a hollow shaft 14 which may be mounted on the rod 7 for both axial and rotary movement relatively thereto. The shaft 14 is externally splined longitudinally and carries an internally splined bevel gear 15 through which the shaft may slide. The gear 15 is suitably supported against axial movement such as in a stationary bracket 16, and is adapted to be driven by a pinion from a source of power to rotate the shaft 14 and series of prongs 12. Suitable means, not shown, are also provided for imparting axial movement of the shaft 14 to lower and raise the prongs with respect to the holding fork. In the drawings conventional means for producing the desired axial movement of shaft 14 are illustrated, and consist of a connecting rod 29 which reciprocates in a vertical direction to move the shaft 14 and series of prongs 12 mounted therein vertically.

In operation a whole fruit such as a grapefruit is peeled and its albedo and circumferential membrane is removed in usual manner such as by immersing in a hot alkali solution. It is then impaled polarwise on the tines 5 of the primary fork 1 which may then be moved to a station of the sectionizing machine where a slit is made along one radial membrane wall of substantially each section. This operation may be performed by a circular series of knives, such as disclosed in our Patent No. 2,246,869 of January 24, 1941, which axially penetrate the fruit sections just outside the series of holding tines and are then moved radially outwardly along the section wall.

After this slitting operation the primary fork, with the fruit still thereon and the section meats still joined to one membrane wall, is moved under and in axial alignment with the auxiliary fork 2. The fork 1 is now raised toward the fork 2 and the shorter tines 6 and 9 are forced into the fruit, the tines 9 being axially aligned respectively with the tines 6 and interdigitated with the longer tines 5. It is to be noted that the fruit is impaled on the holding forks in two stages, first on only half of the tines, the longer tines 5, which requires a substantially low pressure and does not materially squeeze the fruit, and secondly on the remaining tines 6 and 9. It is to be noted also, in this final stage, the tines 5 have penetrated past the seed area and the pressure for inserting the tines 6 and 9 is divided between them. Or stated another way, the pressure of one series of the shorter tines is yieldingly opposed by that of the other series. As a result the fruit is impaled in each of its sections with substantially low pressures and little rupture of the juice sacs. The shorter tines, it will be recalled, penetrate only to the seed region of the section and their ends are axially spaced with the seed lying between them as seen in Figure 1.

After impaling the fruit by both the primary and auxiliary forks, the series of stripping prongs 12 are lowered through the fruit and rotated about the stationary tines. These prongs wrap the radial membrane structure about the holding series of tines and strip the still bonded membrane wall from the section meats which then fall free. This stripping action imposes a substantial tension on the membrane structure, but since there is either one of the tines 5 or a pair of the tines 6 and 9 closely in the apex of each section wall, movement of the whole membrane structure relative to the stationary tines is adequately restrained so that the stripping is efficiently accomplished and the meats cleanly freed from the membrane.

In previous holding forks employing sufficient tines in a circle to penetrate each section, the tines have had to be relatively small to force them through the fruit and considerable bending and breakage at the supporting head has resulted, particularly under the tensioning force imposed on them in the stripping operation. In the present apparatus, however, the longer tines 4 are of sufficient diameter to withstand this force and the tines 5 and 9, while small in diameter, are relatively short and likewise withstand the imposed stresses.

The form of holding fork shown in Figures 4 and 5 is somewhat simpler in construction and is particularly adaptable to seedless varieties of fruit. Here the primary fork, designated 1A, consists of a head 17 at the upper end of a vertical rod 18 which is similar to the head 3 and rod 4 above. Rigidly secured in the head 17 and extending upwardly therefrom is a circular series of eight equally spaced parallel tines 19 of a length sufficient to penetrate approximately through a fruit of average size.

Above and coaxially aligned with the primary fork 1A is a secondary or auxiliary fork 2A which comprises a stationary vertical rod 20, the lower end of which terminates in a head 21. Rigidly secured in the head 21 is a series of eight depending tines 22 arranged in a circle of the same diameter as the series of tines 19 and coaxial therewith. The tines 22 are of substantially the same length as the tines 19, and the relative positions of the heads 17 and 21 are such that the axes of the tines 22 are equally spaced between the axes of the tines 19. The free or entering ends of the tines 19 and 22 are pointed. In this case also the tines 22 may be slightly smaller in diameter than the tines 19. For example, the tines 19 may be $5/32$ inch diameter and the tines 22 $1/8$ inch diameter. Since the tines 19 are inserted first in the fruit alone and serve as a support during the initial slitting operation and during the later insertion of the tines 22, their relatively large diameter supplies adequate rigidity for the purpose. The smaller diameter of the tines 22 has the advantage of easier insertion and to increase slightly the circumferential interdigitating spacing with the tines 19. When in interdigitating combination with the tines 19, however, the smaller diameter supplies adequate restraint to the membrane structure of the fruit in the stripping operation.

The structure shown in Figures 4 and 5 operates and functions in the same manner as that shown in Figures 1 to 3 and described above except that both series of tines penetrate substantially through the fruit in interdigitating relation.

While in the above the primary forks 1 and 1A have been described as moving relatively to the auxiliary forks 2 and 2A, it will be obvious that the primary forks may be stationary and the auxiliary forks moved with respect thereto or the fruit may be positioned between the two forks and both moved simultaneously.

From the foregoing it will be seen that we have provided a holding fork mechanism for supporting citrus fruit to sectionize the same in which at least one tine is provided for each fruit section, in which all tines are arranged in the same circle substantially close to the core of the fruit, and in which the insertion of such a substantial number of tines is made possible without prohibitive destruction of the fruit by equally dividing the total number of tines into two interdigitating series.

We claim:

1. In apparatus for sectionizing citrus fruit, means for supporting the core of the fruit comprising a first series of parallel tines equally spaced circumferentially in a circle for insertion polarwise into sections of the fruit closely surrounding the core thereof, alternate tines of the said series being of a length sufficient to penetrate approximately through the fruit and the remainder of the tines of said series being of a length that when fully inserted will penetrate short of the axial boundary of the seed bearing region of the fruit, a second series of parallel tines corresponding in number with said shorter tines and respectively aligned coaxially therewith, and means for axially moving one series relatively to the other series to insert the two series of tines in the fruit with the tines of the second series in interdigitating relationship to the tines of the first series and in axially opposed relationship to the shorter tines of the first series, the tines of the second series also being of a length that when fully inserted in the fruit they will penetrate short of the axial boundary of said seed bearing region.

2. In apparatus for sectionizing citrus fruit, means for supporting the core of the fruit comprising a first series of parallel tines equally spaced circumferentially in a circle for insertion polarwise into sections of the fruit closely surrounding the core thereof, alternate tines of the said series being of a length sufficient to penetrate substantially into the fruit and the remainder of the tines of said series being of a shorter length, a second series of parallel tines corresponding in number with said shorter tines and respectively aligned coaxially therewith, and means for axially moving one series relatively to the other series to insert the two series of tines in the fruit with the tines of the second series in interdigitating relationship to the longer tines of the first series and in axially opposed relationship to the shorter tines of the first series, said shorter tines and the tines of the second series having lengths so that when fully inserted in the fruit they will penetrate only to the axial boundaries of the seed bearing regions of the fruit, and said shorter tines being of smaller diameter than the longer tines.

3. In apparatus for sectionizing citrus fruit, means for supporting the core of the fruit comprising a first series of parallel tines equally spaced circumferentially in a circle for insertion polarwise into sections of the fruit closely surrounding the core thereof, alternate tines of the said series being of a length sufficient to penetrate substantially into the fruit and the remainder of the tines of said series being of a shorter length, a second series of parallel tines corresponding in number with said shorter tines and respectively aligned coaxially therewith, and means for axially moving one series relatively to the other series to insert the two series of tines in the fruit with the tines of the second series in interdigitating relationship to the tines of the first series and in axial opposed relationship to the shorter tines of the first series, the number of tines in the first series being sufficient for at least one tine to penetrate each section of the fruit.

4. In apparatus for sectionizing citrus fruit, means for supporting the core of the fruit comprising a first series of parallel tines equally spaced circumferentially in a circle for insertion polarwise into sections of the fruit closely surrounding the core thereof, alternate tines of the said series being of a length sufficient to penetrate substantially into the fruit and the remainder of the tines of said series being of a shorter length, a second series of parallel tines corresponding in number with said shorter tines and respectively aligned coaxially therewith, and means for axially moving one series relatively to the other series to insert the two series of tines in the fruit with the tines of the second series in interdigitating relationship to the tines of the first series and in axially opposed relationship to the shorter tines of the first series, the length of the shorter tines of the first series and the tines of the second series being such that when inserted fully in the fruit they will penetrate only to the axial boundaries of the seed bearing regions of the fruit sections.

5. In apparatus for sectionizing citrus fruit, means for supporting the core of the fruit comprising a first series of parallel tines equally spaced circumferentially in a circle for insertion polarwise into sections of the fruit closely surrounding the core thereof, said tines being of a length sufficient to penetrate approximately through the fruit, a second series of parallel tines in coaxial alignment with the fruit series and equally spaced circumferentially in a circle of the same diameter as the first series, the tines of the second series being staggered with respect to the tines of the first series and also of a length sufficient to penetrate approximately through the fruit, and means for axially moving one series relatively to the other series to insert the two series of tines in interdigitating relationship in the fruit.

6. In apparatus for sectionizing citrus fruit, means for supporting the core of the fruit comprising a first series of parallel tines equally spaced circumferentially in a circle for insertion polarwise into sections of the fruit closely surrounding the core thereof, said tines being of a length sufficient to penetrate approximately through the fruit, an axially opposed second series of parallel tines in coaxial alignment with the first series and equally spaced circumferentially in a circle of the same diameter as the first series, the tines of the second series being staggered with respect to the tines of the first series and also of a length sufficient to penetrate approximately through the fruit, and means for axially moving one series relatively to the other series to insert the two series of tines in interdigitating relationship in the fruit from opposite poles thereof.

7. In apparatus for sectionizing citrus fruit, means for supportnig the core of the fruit comprising a first series of parallel tines equally spaced circumferentially in a circle for insertion polarwise into sections of the fruit closely surrounding the core thereof, said tines being of a length sufficient to penetrate approximately through the fruit, a second series of parallel tines in coaxial alignment with the first series and equally spaced circumferentially in a circle of the same diameter as the first series, the tines of the second series being staggered with respect to the tines of the first series and also of a length sufficient to penetrate approximately through the fruit, and means for axially moving one series relatively to the other series to insert the two series of tines in interdigitating relationship in the fruit, the total number of tines being equally divided between the two series and said total number being sufficient when interdigitated for at least one tine to penetrate each section of the fruit.

RALPH POLK, Sr.
RALPH POLK, Jr.

REFERENCES CITED

The following references are of record in the file of this patent:

UNITED STATES PATENTS

| Number | Name | Date |
|---|---|---|
| 1,220,970 | Frohmann | Mar. 27, 1917 |
| 1,257,587 | Demuth | Feb. 26, 1918 |
| 2,089,503 | Polk, Jr. | Aug. 10, 1937 |
| 2,240,909 | Polk, Sr., et al. | May 6, 1941 |
| 2,300,311 | Polk, Sr., et al. | Oct. 27, 1942 |
| 2,403,516 | Gaddini | July 9, 1946 |